US010119249B2

(12) United States Patent
Lee et al.

(10) Patent No.: US 10,119,249 B2
(45) Date of Patent: Nov. 6, 2018

(54) CONTROL DEVICE FOR CONFLUENCE FLOW RATE OF WORKING DEVICE FOR CONSTRUCTION MACHINERY AND CONTROL METHOD THEREFOR

(71) Applicant: VOLVO CONSTRUCTION EQUIPMENT AB, Eskilstuna (SE)

(72) Inventors: Jae-Hoon Lee, Gyeongsangnam-do (KR); Hea-Gyoon Joung, Busan (KR); Sang-Hee Lee, Gyeongsangnam-do (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 214 days.

(21) Appl. No.: 15/301,063

(22) PCT Filed: Mar. 31, 2014

(86) PCT No.: PCT/KR2014/002737
§ 371 (c)(1),
(2) Date: Sep. 30, 2016

(87) PCT Pub. No.: WO2015/152434
PCT Pub. Date: Oct. 8, 2015

(65) Prior Publication Data

US 2017/0030053 A1 Feb. 2, 2017

(51) Int. Cl.
*F16D 31/02* (2006.01)
*E02F 9/22* (2006.01)
(Continued)

(52) U.S. Cl.
CPC .......... *E02F 9/2228* (2013.01); *E02F 9/2004* (2013.01); *E02F 9/2267* (2013.01);
(Continued)

(58) Field of Classification Search
CPC ..... E02F 9/2228; E02F 9/2004; E02F 9/2267; E02F 9/2285; F15B 11/16; F15B 11/17
(Continued)

(56) References Cited

U.S. PATENT DOCUMENTS

| | | | |
|---|---|---|---|
| 7,992,384 | B2 | 8/2011 | Itakura et al. |
| 8,387,376 | B2 | 3/2013 | Son |

(Continued)

FOREIGN PATENT DOCUMENTS

| | | | |
|---|---|---|---|
| JP | 4338758 | B2 | 10/2009 |
| KR | 20100063939 | A | 6/2010 |

(Continued)

OTHER PUBLICATIONS

International Search Report for Application No. PCT/KR2014/002737 dated Dec. 22, 2014.

*Primary Examiner* — Thomas E Lazo
*Assistant Examiner* — Daniel Collins
(74) *Attorney, Agent, or Firm* — Lerner, David, Littenberg, Krumholz & Mentlik, LLP

(57) ABSTRACT

Disclosed are a control device for confluence flow rate of a working device and a control method therefor, the control device being capable of minutely operating a working device when a flow rate supplied to the working device is merged or blocked. Provided is a control device for confluence flow rate of a working device for construction machinery according to the present invention, the control device comprising: first and second hydraulic pumps and a pilot pump; first and second hydraulic operating levers; first and second working devices operated by operating oil supplied from the first and second hydraulic pumps; a control valve for the first working device, installed on a supply path between the first hydraulic pump and the first working device; a control valve for the second working device,
(Continued)

installed on a supply path between the second hydraulic pump and the second working device; a confluence valve installed on the supply path upstream of the control valve for the second working device; a first proportional control valve installed in a pilot line between the pilot pump and the confluence valve; and a controller for calculating, as electrical signals, pilot pressures applied to the control valves for first and second working devices in proportion to the operation amount of the first and second hydraulic operating levers and thus applying the operated electrical signal to the first proportional control valve.

7 Claims, 6 Drawing Sheets

(51) Int. Cl.

| | |
|---|---|
| ***F15B 11/17*** | (2006.01) |
| ***E02F 9/20*** | (2006.01) |
| ***F15B 13/06*** | (2006.01) |

(52) U.S. Cl.
CPC .......... *E02F 9/2285* (2013.01); *E02F 9/2292* (2013.01); *E02F 9/2296* (2013.01); *F15B 11/17* (2013.01); *F15B 13/06* (2013.01); *F15B 2211/20546* (2013.01); *F15B 2211/20576* (2013.01); *F15B 2211/255* (2013.01); *F15B 2211/27* (2013.01); *F15B 2211/30595* (2013.01); *F15B 2211/7142* (2013.01)

(58) Field of Classification Search
USPC .................................. 60/430, 484, 486, 428
See application file for complete search history.

(56) References Cited

U.S. PATENT DOCUMENTS

2006/0130473 A1* 6/2006 Kim .................... E02F 9/2282 60/430
2008/0034746 A1 2/2008 Verkuilen

FOREIGN PATENT DOCUMENTS

KR 20100125960 A 12/2010
KR 20110075066 A 7/2011

* cited by examiner

CONTROL DEVICE FOR CONFLUENCE FLOW RATE OF WORKING DEVICE FOR CONSTRUCTION MACHINERY AND CONTROL METHOD THEREFOR

CROSS-REFERENCE TO RELATED APPLICATION

This application is a national phase entry under 35 U.S.C. § 371 of International Application No. PCT/KR2014/002737, filed Mar. 31, 2014, published in Korean, the disclosure of which is incorporated herein by reference.

TECHNICAL FIELD

The present disclosure relates to a confluent flow control device for a working device of a construction machine and a method of controlling the same. More particularly, the present disclosure relates to a confluent flow control device for a working device of a construction machine, the device being able to precisely manipulate working devices when allowing flows of fluid supplied to the working devices to join or controlling the working devices to perform complex operations, and a method of controlling the same.

BACKGROUND ART

FIG. 1 is a hydraulic circuit diagram of a working device control device for a construction machine of the prior art.

As illustrated in FIG. 1, first and second variable displacement hydraulic pumps (hereinafter referred to as first and second hydraulic pumps) 2 and 3 are connected to an engine 1 or the like.

First and second hydraulic control levers 4 and 5 output control signals corresponding to the degree of manipulation.

A first working device (not shown) is actuated by hydraulic fluid supplied through a supply passage 6 by the first hydraulic pump 2.

A second working device (not shown) is actuated by hydraulic fluid supplied through a supply passage 8 by the second hydraulic pump 3.

A first working device control valve 7 is disposed on the supply passage 6 between the first hydraulic pump 2 and the first working device. When the first working device control valve 7 is switched by pilot pressure applied by the first hydraulic control lever 4, the first working device control valve 7 controls the direction and flow rate of hydraulic fluid supplied to the first working device.

A second working device control valve 9 is disposed on the supply passage 8 between the second hydraulic pump 3 and the second working device. When the second working device control valve 9 is switched by pilot pressure applied by the second hydraulic control lever 5, the second working device control valve 9 controls the direction and flow rate of hydraulic fluid supplied to the second working device.

A confluence valve 10 is disposed on the supply passage 8, upstream of the second working device control valve 9. When the confluence valve 10 is switched by pilot pressure applied by the first hydraulic control lever 4 so that the first and second working devices perform complex operations, the confluence valve 10 allows a portion of hydraulic fluid discharged from the second hydraulic pump 3 to flow through a confluence passage 14 to join hydraulic fluid discharged from the first hydraulic pump 2.

A confluence shut-off valve 12 is disposed on a pilot line 11 through which pilot pressure is applied. When the confluence shut-off valve 12 is switched by pilot pressure applied by the second hydraulic control lever 5, the confluence shut-off valve 12 shuts off the supply of pilot pressure to the confluence valve 10.

Reference numeral 13 in the drawings, while not referred to, is a main control valve (MCV).

When the first hydraulic control lever 4 is manipulated to operate the first working device, a spool is switched to the right, as depicted in the drawing, by pilot pressure applied to the first working device control valve 7. Subsequently, hydraulic fluid supplied by the first hydraulic pump 2 is supplied to a hydraulic cylinder for the first working device through the supply passage 6, the switched first working device control valve 7, and a passage **14*a***.

When the flow rate of hydraulic fluid required by the first working device is greater than the maximum flow rate of hydraulic fluid supplied by the first hydraulic pump 2, a portion of hydraulic fluid discharged from the second hydraulic pump 3 is allowed to join hydraulic fluid discharged from the first hydraulic pump 2. That is, in response to the first hydraulic control lever 4 being manipulated, pilot pressure is applied to the first working device control valve 7. At the same time, in response to the first hydraulic control lever 4 being manipulated, pilot pressure is applied to the confluence valve 10 through the pilot line 11 and then through the confluence shut-off valve 12. Here, the spool of the confluence valve 10 is switched to the left, as depicted in the drawing.

As illustrated in FIG. 5, the spool of the confluence valve 10 is not switched when pilot pressure from the first hydraulic control lever 4 is lower than the joining point and is switched when the pilot pressure becomes equal to or greater than the joining point. Thus, hydraulic fluid discharged from the second hydraulic pump 3 flows through the supply passage 8, an inner passage **10*a* of the switched confluence valve 10, and the confluence passage 14, and then in the passage 14*a*, joins hydraulic fluid that has been supplied by the first hydraulic pump 2 through the first working device control valve 7**.

When the spool of the second working device control valve 9 is switched by pilot pressure applied by the second hydraulic control lever 5 to operate the second working device, the second working device control valve 9 is supplied with an insufficient amount of hydraulic fluid from the second hydraulic pump 3, since a portion of hydraulic fluid discharged from the second hydraulic pump 3 has been supplied for the first working device in response to the switching of the confluence valve 10.

When the second hydraulic control lever 5 is manipulated to prevent this problem, pilot pressure is applied to the second working device control valve 9 and the confluence shut-off valve 12. Here, the spool of the confluence shut-off valve 12 is switched downwardly, as depicted in the drawing.

Thus, it is possible to ensure that hydraulic fluid is supplied to the second working device by the second hydraulic pump 3 by shutting off pilot pressure applied to the confluence valve 10 by the first hydraulic control lever 4 to be proportional to pilot pressure applied by the second hydraulic control lever 5.

Here, according to the characteristics of the spool of the confluence shut-off valve 12, in a transition period before the spool is switched to a full open state, pilot pressure is not formed in the pilot line 11 to a level desired by an operator, for various reasons, such as internal leakage or communication with a hydraulic fluid tank.

In addition, a pilot line, through which pilot pressure is applied by the first hydraulic control lever 4 to the first working device control valve 7, communicates with the pilot line 11. This causes pressure loss due to internal leakage or the like. Consequently, the operator cannot control the first working device as accurately as he or she may desire.

In addition, the confluence shut-off valve 12 is configured such that the spool thereof can be mechanically controlled. Once the confluence shut-off valve 12 is assembled by setting the open area of the spool, it is difficult to adjust the open area. In addition, in construction machines, it is difficult to realize an approach of variably controlling the spool of the confluence valve 10 using pilot pressure by manipulating the first and second hydraulic control levers 4 and 5, which is problematic.

In addition, in the confluence valve 10, the control period of the right portion of the spool (to be used in joining for the first working device when the spool is switched) is different from the control period of the left portion of the spool (to be used in control over the other working device). Thus, valve springs on the right and left of the spool are required to have different specifications.

FIG. 2 is a hydraulic circuit diagram of another working device control device for a construction machine of the prior art.

As illustrated in FIG. 2, first and second variable displacement hydraulic pumps (hereinafter referred to as first and second hydraulic pumps) 2 and 3 are connected to an engine 1 or the like.

First and second hydraulic control levers 4 and 5 output control signals corresponding to the degree of manipulation.

A first working device (not shown) is actuated by hydraulic fluid supplied through a supply passage 6 by the first hydraulic pump 2.

A second working device (not shown) is actuated by hydraulic fluid supplied through a supply passage 8 by the second hydraulic pump 3.

A first working device control valve 7 is disposed on the supply passage 6 between the first hydraulic pump 2 and the first working device. When the first working device control valve 7 is switched by pilot pressure applied by the first hydraulic control lever 4, the first working device control valve 7 controls the direction and flow rate of hydraulic fluid supplied to the first working device.

A second working device control valve 9 is disposed on the supply passage 8 between the second hydraulic pump 3 and the second working device. When the second working device control valve 9 is switched by pilot pressure applied by the second hydraulic control lever 5, the second working device control valve 9 controls the direction and flow rate of hydraulic fluid supplied to the second working device.

A confluence valve 10 is disposed on the supply passage 8, upstream of the second working device control valve 9. When the confluence valve 10 is switched by pilot pressure applied by the first hydraulic control lever 4 so that the first and second working devices perform complex operations, the confluence valve 10 allows a portion of hydraulic fluid discharged from the second hydraulic pump 3 to flow through a confluence passage 14 to join hydraulic fluid discharged from the first hydraulic pump 2.

A first pressure sensor 15 detects the level of pilot pressure applied to the second working device control valve 9 from the second hydraulic control lever 5.

A first proportional control valve 16 is disposed on a pilot line 11 through which pilot pressure is applied to the confluence valve 10 by the first hydraulic control lever 4. The first proportional control valve 16 converts pilot pressure, formed in response to the first hydraulic control lever 4 being manipulated, to have a secondary pressure, proportional to an electrical signal applied to the first proportional control valve 16 and applies the secondary pressure to the confluence valve 10.

A controller 17 has a detection signal input thereto by the first pressure sensor 15. The controller 17 applies an electrical signal to the first proportional control valve 16 so that a control signal, calculated to be inversely proportional to the input detection signal, can be applied to the confluence valve 10.

Thus, when the first hydraulic control lever 4 is manipulated to operate the first working device, the spool of the first working device control valve 7 is switched to the right, as depicted in the drawing, by pilot pressure applied thereto. At the same time, pilot pressure formed in response to the first hydraulic control lever 4 being manipulated is converted to a secondary pilot pressure in response to an electrical signal applied to the first proportional control valve 16 by the controller 17. The level of secondary pressure is applied to the confluence valve 10 through the pilot line 11.

Here, when the spool of the second working device control valve 9 is switched in response to the second hydraulic control lever 5 being manipulated to operate the second working device, pilot pressure applied to the second working device control valve 9 is detected by the first pressure sensor 15 and a detection signal is input to the controller 17.

At this time, the controller 17 applies an electrical signal to the first proportional control valve 16 such that the electrical signal is inversely proportional to the level of pilot pressure applied to the second working device control valve 9. Thus, a secondary pilot pressure formed by the first proportional control valve 16 reduces pilot pressure which is otherwise applied to the confluence valve 10 by the first hydraulic control lever 4.

Consequently, the open area of the spool of the confluence valve 10 can be variably controlled depending on the level of pilot pressure applied by the second hydraulic control lever 5 to the second working device control valve 9.

In addition, a pilot line, through which pilot pressure is applied by the first hydraulic control lever 4 to the first working device control valve 7, communicates with the pilot line 11, through which pilot pressure is applied to the confluence valve 10 by the first hydraulic control lever 4. This causes pressure loss due to internal leakage or the like. Consequently, the operator cannot control the first working device as accurately as he or she desires.

In addition, in the case of switching the spool of the first working device control valve 7 by manipulating the first hydraulic control lever 4, a portion of pilot pressure for switching the first working device control valve 7 influences the spool of the confluence valve 10 through the pilot line 11. In such a case, it is impossible to precisely manipulate the first and second working devices, which is problematic.

Furthermore, since pilot pressure formed by manipulating the first hydraulic control lever 4 is used as pilot pressure supplied to the first proportional control valve 16, a secondary pilot pressure formed by the first proportional control valve 16 cannot be arbitrarily changed. Thus, right and left valve springs of the spool of the confluence valve 10 are required to have different specifications.

DISCLOSURE

Technical Problem

Accordingly, the present disclosure has been made in consideration of the above problems occurring in the related art, and the present disclosure provides a confluent flow control device for a working device of a construction machine, the device being able to precisely manipulate working devices when enabling the working devices to perform complex operations or allowing flows of fluid supplied to the working devices to join, thereby improving operability and convenience.

Also provided is a confluent flow control device for a working device of a construction machine, the device allowing pilot pressure to be supplied to a proportional control valve from a pilot pump to control pilot pressure supplied to a confluence valve, whereby the proportional control valve can output a secondary pilot pressure, different from a control signal output from a control lever.

Technical Solution

According to an aspect of the present disclosure, a confluent flow control device for a working device of a construction machine may include:

a first variable displacement hydraulic pump, a second variable displacement hydraulic pump, and a pilot pump;

a first hydraulic control lever and a second hydraulic control lever outputting control signals corresponding to degrees of manipulation;

a first working device being actuated by hydraulic fluid supplied by the first hydraulic pump;

a second working device being actuated by hydraulic fluid supplied by the second hydraulic pump;

a first working device control valve disposed on a supply passage between the first hydraulic pump and the first working device to control a direction and flow rate of hydraulic fluid supplied to the first working device when switched by pilot pressure applied thereto in response to the first hydraulic control lever being manipulated;

a second working device control valve disposed on a supply passage between the second hydraulic pump and the second working device to control a direction and flow rate of hydraulic fluid supplied to the second working device when switched by pilot pressure applied thereto in response to the second hydraulic control lever being manipulated;

a confluence valve disposed on the supply passage between the second hydraulic pump and the second working device, upstream of the second working device control valve, wherein the confluence valve, when switched by pilot pressure supplied by the pilot pump, allows a portion of hydraulic fluid discharged from the second hydraulic pump to flow through a confluence passage to join hydraulic fluid discharged from the first hydraulic pump, whereby the first and second working devices perform complex operations;

a first proportional control valve disposed on a pilot line between the pilot pump and the confluence valve to convert pilot pressure supplied to the confluence valve by the pilot pump to secondary pressure corresponding to an electrical signal applied to first proportional control valve and applying the converted secondary pressure to the confluence valve; and a controller calculating the electrical signal from pilot pressure applied to the first working device control valve and the second working device control valve to be proportional to degrees of manipulation of the first hydraulic control lever and the second hydraulic control lever and applying the calculated electrical signals to the first proportional control valve.

The confluent flow control device may further include:

a first pressure sensor detecting a level of pilot pressure applied to the first working device control valve to be proportional to the degree of manipulation of the first hydraulic control lever and inputting the detected level of pilot pressure to the controller; and a second pressure sensor detecting a level of pilot pressure applied to the second working device control valve to be proportional to the degree of manipulation of the second hydraulic control lever and inputting the detected level of pilot pressure to the controller.

According to another aspect of the present disclosure, a confluent flow control device for a working device of a construction machine may include:

a first variable displacement hydraulic pump, a second variable displacement hydraulic pump, and a pilot pump;

a first electrical control lever and a second electrical control lever outputting control signals corresponding to degrees of manipulation;

a first working device being actuated by hydraulic fluid supplied by the first hydraulic pump;

a second working device being actuated by hydraulic fluid supplied by the second hydraulic pump;

a first working device control valve disposed on a supply passage between the first hydraulic pump and the first working device to control a direction and flow rate of hydraulic fluid supplied to the first working device when switched by pilot pressure applied by the pilot pump, with the pilot pressure corresponding to a degree of manipulation of the first electrical control lever;

a second working device control valve disposed on a supply passage between the second hydraulic pump and the second working device to control a direction and flow rate of hydraulic fluid supplied to the second working device when switched by pilot pressure applied by the pilot pump, with the pilot pressure corresponding to a degree of manipulation of the second electrical control lever;

a confluence valve disposed on the supply passage between the second hydraulic pump and the second working device, upstream of the second working device control valve, wherein the confluence valve, when switched by pilot pressure supplied by the pilot pump, allows a portion of hydraulic fluid discharged from the second hydraulic pump to flow through a confluence passage to join hydraulic fluid discharged from the first hydraulic pump, whereby the first and second working devices perform complex operations;

a first proportional control valve disposed on a pilot line between the pilot pump and the confluence valve to convert pressure of hydraulic fluid supplied by the pilot pump to a secondary pilot pressure corresponding to an electrical signal applied to the first proportional control valve and apply the converted secondary pilot pressure to the confluence valve;

a second proportional control valve disposed on a pilot line between the pilot pump and the first working device control valve to convert pressure of hydraulic fluid supplied by the pilot pump to a secondary pilot pressure corresponding to an electrical signal applied to the second proportional control valve corresponding to the degree of manipulation of the first electrical control lever, and apply the converted secondary pilot pressure to the first working device control valve;

a third proportional control valve disposed on a pilot line between the pilot pump and the second working device control valve to convert pressure of hydraulic fluid supplied by the pilot pump to a secondary pilot pressure corresponding to an electrical signal applied to the third proportional control valve corresponding to the degree of manipulation of the second electrical control lever, and apply the converted secondary pilot pressure to the second working device control valve; and a controller calculating the electrical signal from the electrical signals applied to the second proportional control valve and the third proportional control valve to be proportional to the degrees of manipulation of the first electrical control lever and the second electrical control lever and applying the calculated electrical signals to the first proportional control valve.

According to another aspect of the present disclosure, provided is a method of controlling a confluent flow control device for a working device of a construction machine.

In the controlling method, the device may include: first and second variable displacement hydraulic pumps; a pilot pump; first and second hydraulic control levers outputting control signals corresponding to degrees of manipulation; first and second working devices being actuated by hydraulic fluid supplied by the first and second hydraulic pumps; first and second working device control valves controlling operations of the first and second working devices when switched by pilot pressure applied thereto in response to the first and second hydraulic control levers being manipulated; a confluence valve, wherein the confluence valve, when switched by pilot pressure applied by the pilot pump, allows a portion of hydraulic fluid discharged from the second hydraulic pump to flow through a confluence passage to join hydraulic fluid discharged from the first hydraulic pump, whereby the first and second working devices perform complex operations; a first proportional control valve converting pilot pressure supplied to the confluence valve by the pilot pump to a secondary pressure corresponding to an electrical signal applied to the first proportional control valve; and a controller applying the electrical signal to the first proportional control valve, the electrical signal corresponding to pilot pressure formed in response to the first and second hydraulic control levers being manipulated.

The controlling method may include:

detecting a level of pilot pressure formed in response to the first hydraulic control lever being manipulated and detecting a level of pilot pressure formed in response to the second hydraulic control lever being manipulated;

converting pilot pressure supplied to the first proportional control valve by the pilot pump to a secondary pilot pressure based on an electrical signal applied to the first proportional control valve to be proportional to a degree of manipulation of the first hydraulic control lever and applying the secondary pilot pressure to the confluence valve;

comparing the level of pilot pressure detected in response to the second hydraulic control lever being manipulated with a predetermined specific level; and when the level of pilot pressure detected in response to the second hydraulic control lever being manipulated is greater than the specific level, applying an electrical signal to the first proportional control valve to apply a level of pilot pressure to the confluence valve, the level of pilot pressure being obtained by multiplying a level of secondary pilot pressure output from the first proportional control valve to be proportional to the degree of manipulation of the first hydraulic control lever by a level of secondary pilot pressure output from the first proportional control valve to be inversely proportional to a degree of manipulation of the second hydraulic control lever.

In the controlling method, in a case of switching the second working device control valve by manipulating the second hydraulic control lever after a portion of hydraulic fluid discharged from the second hydraulic pump is allowed to join hydraulic fluid discharged from the first hydraulic pump through switching of the confluence valve in response to the first hydraulic control lever being manipulated, when a difference between levels of pilot pressure applied to the first and second working device control valves in response to the first and second hydraulic control levers being manipulated is greater than a specific level, joining of hydraulic fluid may be stopped by shutting off supply of pilot pressure to the confluence valve by applying an electrical signal to the first proportional control valve.

According to another aspect of the present disclosure, provided is method of controlling a confluent flow control device for a working device of a construction machine.

In the controlling method, the device may include: first and second variable displacement hydraulic pumps; a pilot pump; first and second electrical control levers outputting control signals corresponding to degrees of manipulation; first and second working devices being actuated by hydraulic fluid supplied by the first and second hydraulic pumps; first and second working device control valves controlling operations of the first and second working devices when switched by electrical signals applied in response to the first and second electrical control levers being manipulated; a confluence valve, wherein the confluence valve, when switched by pilot pressure supplied by the pilot pump, allows a portion of hydraulic fluid discharged from the second hydraulic pump to flow through a confluence passage to join hydraulic fluid discharged from the first hydraulic pump, whereby the first and second working devices perform complex operations; a first proportional control valve converting pressure of hydraulic fluid supplied to the confluence valve by the pilot pump to a secondary pilot pressure corresponding to an applied electrical signal; a second proportional control valve converting pressure of hydraulic fluid supplied to the first working device control valve by the pilot pump to a secondary pilot pressure corresponding to an applied electrical signal; a third proportional control valve converting the pressure of hydraulic fluid supplied to the second working device control valve by the pilot pump to a secondary pilot pressure corresponding to an applied electrical signal; and a controller calculating the electrical signal from the electrical signals applied to the second and third proportional control valves to be proportional to degrees of manipulation of the first and second electrical control levers and applying the calculated electrical signal to the first proportional control valve.

The controlling method may include:

detecting an electrical signal generated in response to the first electrical control lever being manipulated;

calculating an electrical signal to be proportional to the degree of manipulation of the first electrical control lever and applying the calculated electrical signal to the second proportional control valve;

detecting an electrical signal generated in response to the second electrical control lever being manipulated;

calculating an electrical signal to be proportional to the degree of manipulation of the second electrical control lever and applying the calculated electrical signal to the third proportional control valve;

converting pilot pressure supplied to the first proportional control valve by the pilot pump to a secondary pilot pressure based on an electrical signal applied to the first proportional control valve to be proportional to the degree of manipulation of the first electrical control lever and applying the converted secondary pilot pressure to the confluence valve;

comparing a level of an electrical signal detected in response to the second electrical control lever being manipulated with a predetermined specific level; and when the level of the electrical signal detected in response to the second electrical control lever being manipulated is greater than the specific level, applying an electrical signal to the first proportional control valve to apply a level of pilot pressure to the confluence valve, the level of pilot pressure being obtained by multiplying a level of secondary pilot pressure output from the first proportional control valve to be proportional to the degree of manipulation of the first electrical control lever by a level of secondary pilot pressure output from the first proportional control valve to be inversely proportional to the degree of manipulation of the second electrical control lever.

In the controlling method, in a case of switching the second working device control valve by manipulating the second electrical control lever after a portion of hydraulic fluid discharged from the second hydraulic pump is allowed to join hydraulic fluid discharged from the first hydraulic pump through switching of the confluence valve in response to the first electrical control lever being manipulated, when a difference between levels of electrical signals applied to the second and third proportional control valves in response to the first and second electrical control levers being manipulated is greater than a specific level, the joining of hydraulic fluid may be stopped by shutting off supply of pilot pressure to the confluence valve by applying an electrical signal to the first proportional control valve.

Advantageous Effects

According to the present disclosure as set forth above, when flows of fluid supplied to working devices to enable the working devices to perform complex operations join, the operability of accurately and reliably manipulating the confluence valve is obtained, thereby providing convenience to an operator.

In addition, since pilot pressure supplied to the proportional control valve to control pilot pressure supplied to the confluence valve is supplied by the pilot pump, the spools for the working devices can be switched without interruption, and the proportional control valve can output a secondary pilot pressure different from a control signal output from the control lever. Consequently, it is possible to precisely manipulate the working devices when allowing flows of fluid supplied to the working devices to join or enabling the working devices to perform complex operations.

DESCRIPTION OF REFERENCE NUMERALS IN DRAWINGS

Figure 1:
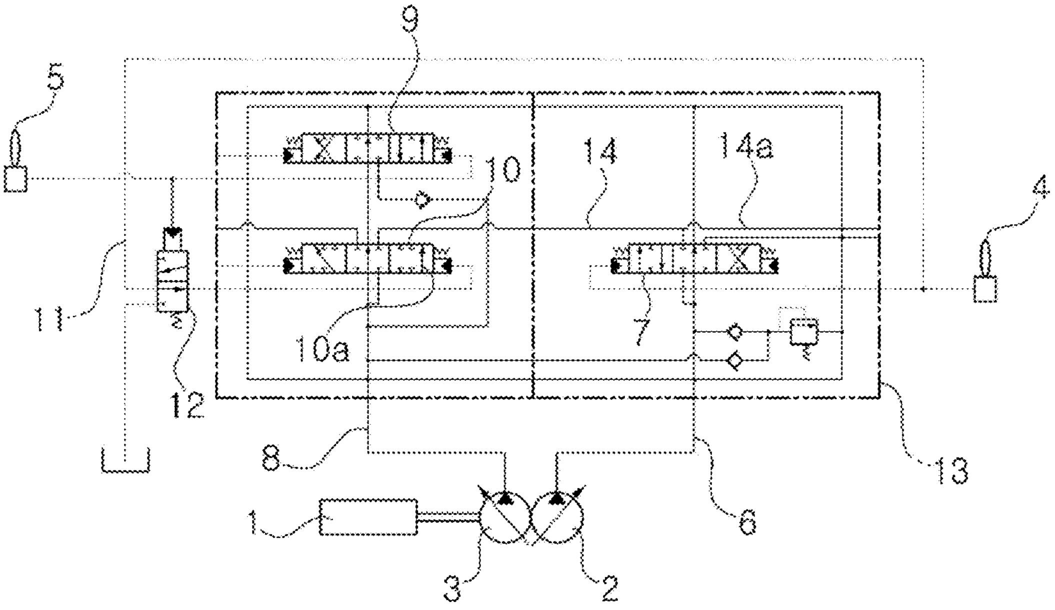
FIG. 1 is a hydraulic circuit diagram illustrating a working device control device for a construction machine of the prior art.
Figure 2:
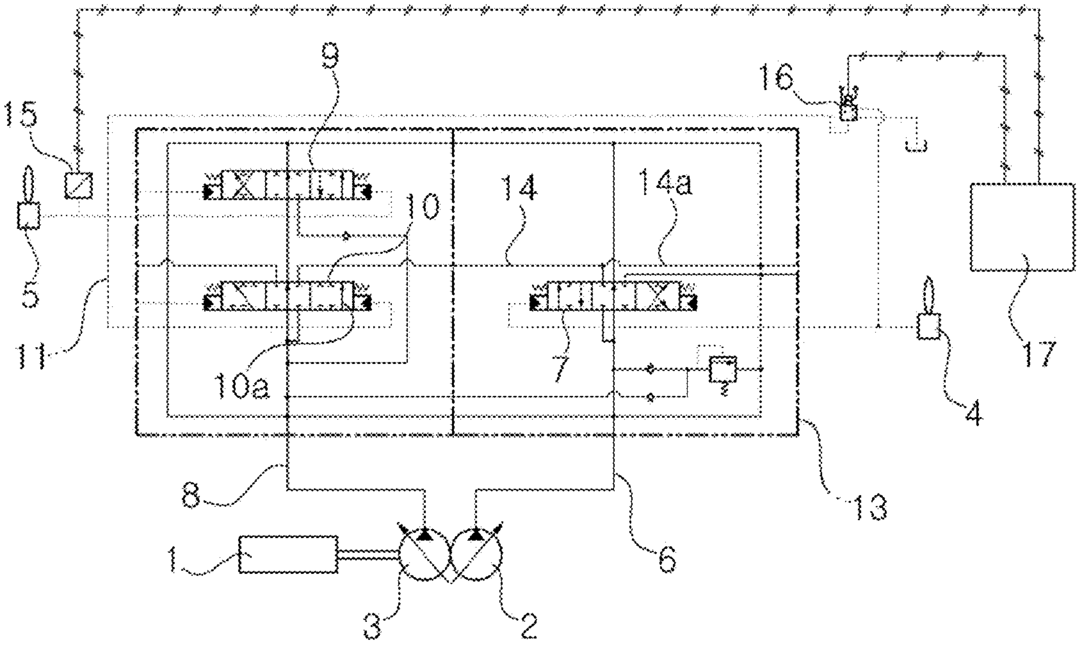
FIG. 2 is a hydraulic circuit diagram illustrating another working device control device for a construction machine of the prior art.

1: engine
2: first hydraulic pump
3: second hydraulic pump
4: first hydraulic control lever
5: second hydraulic control lever
6, 8: supply passage
7: first working device control valve
9: second working device control valve
10: confluence valve

BEST MODE

Hereinafter, a confluent flow control device for a working device of a construction machine and a method of controlling the same according to exemplary embodiments of the present disclosure will be described in detail with reference to the accompanying drawings.

Figure 3:
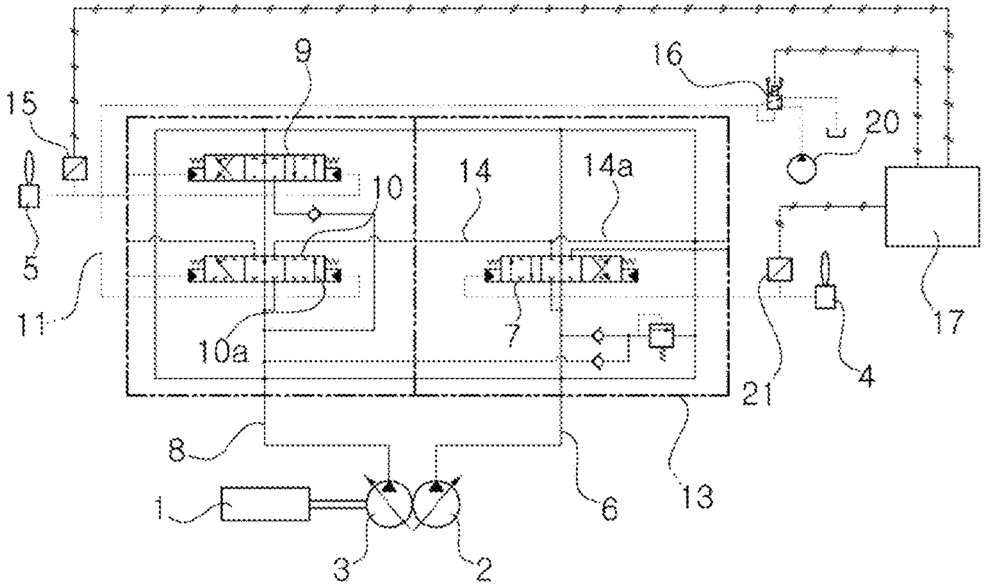
FIG. 3 is a hydraulic circuit diagram illustrating a first embodiment of a confluent flow control device for a working device of a construction machine according to the present disclosure.
Figure 4:
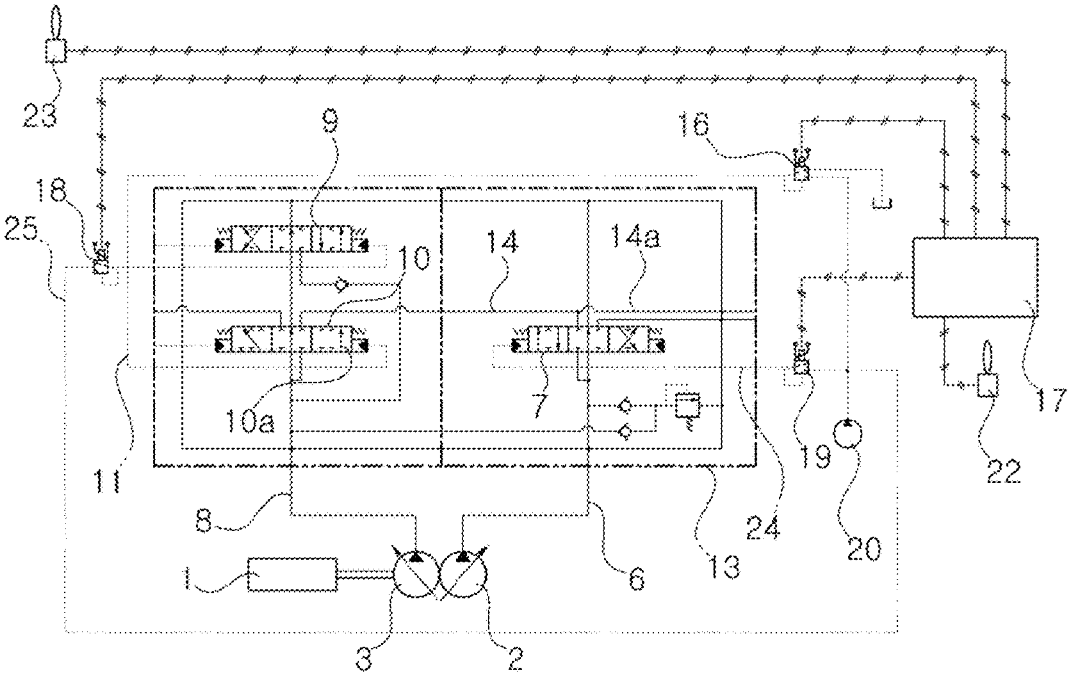
FIG. 4 is a hydraulic circuit diagram illustrating a second embodiment of a confluent flow control device for a working device of a construction machine according to the present disclosure.
Figure 5:
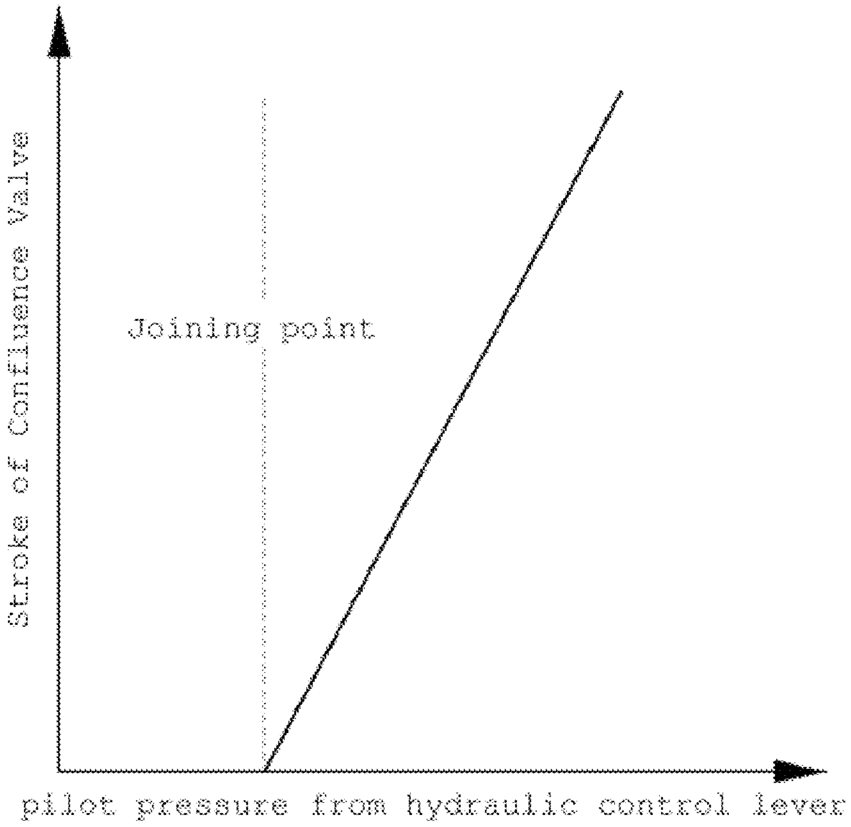
FIG. 5 is a graph illustrating the characteristics of a valve spring of a working device confluence spool illustrated in FIG. 1.
Figure 6:
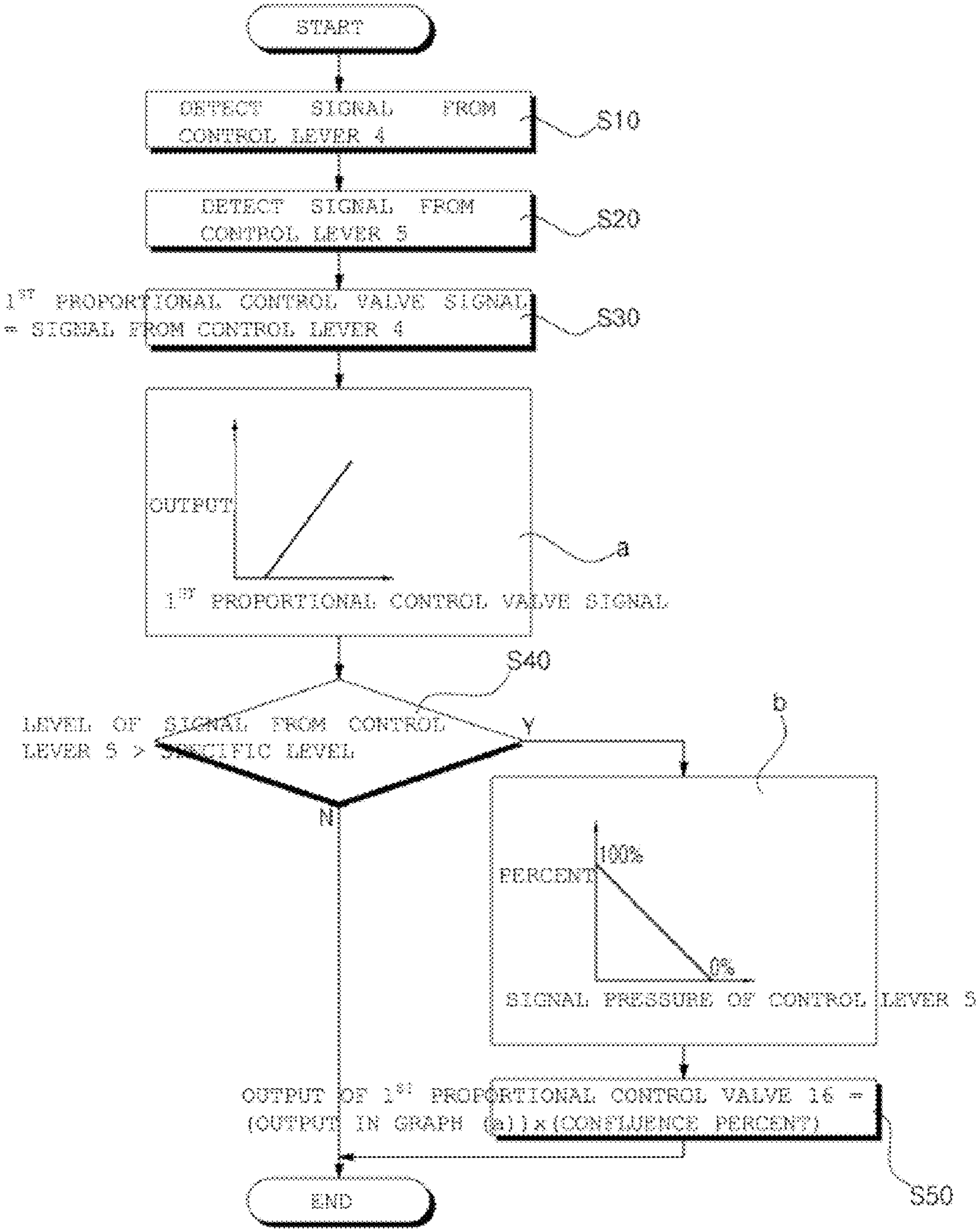
FIG. 6 is a flowchart illustrating a method of controlling a confluent flow control device for a working device of a construction machine according to the first embodiment of the present disclosure.
Figure 7:
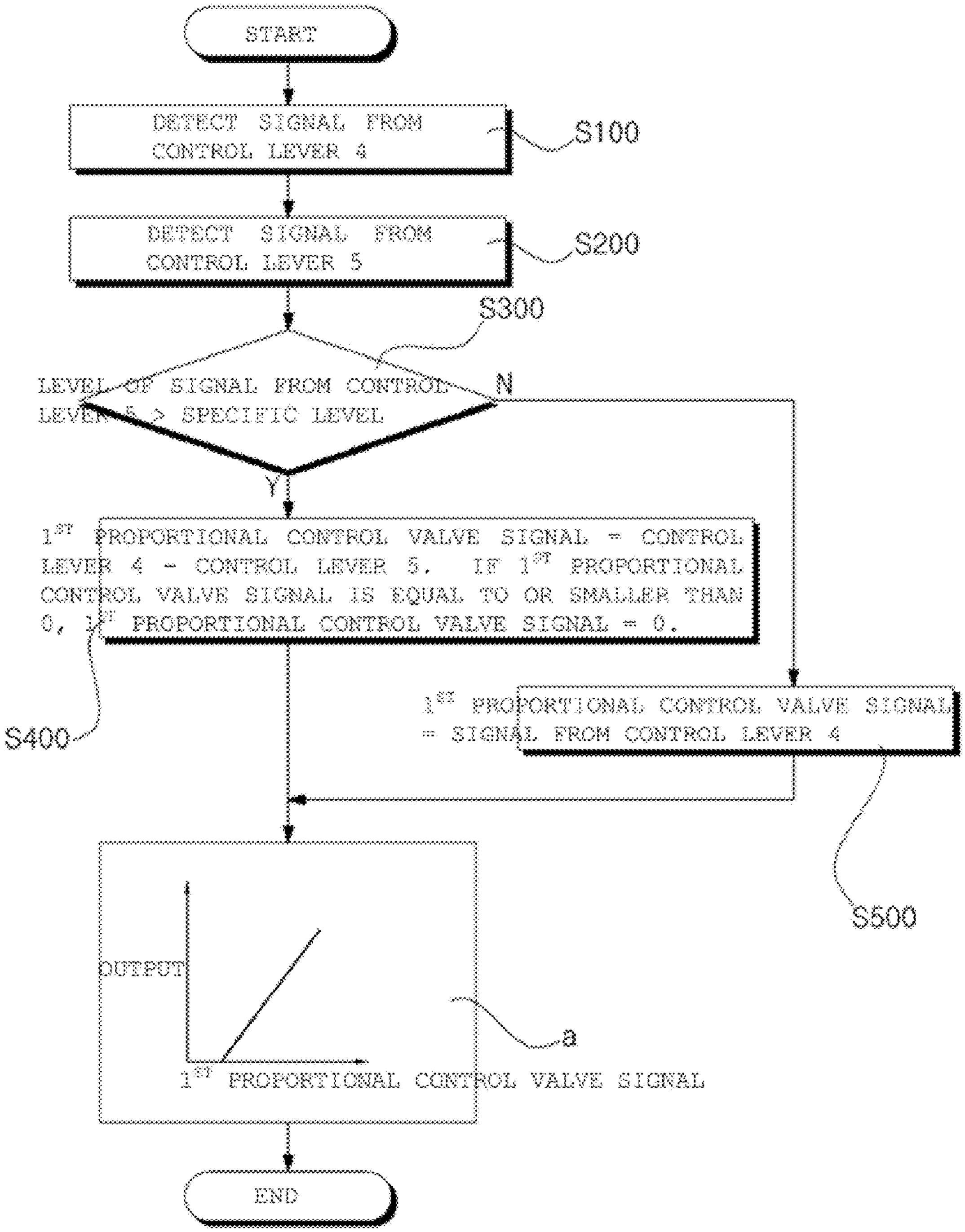
FIG. 7 is a flowchart illustrating a confluence shutting-off method of the confluence valve in the method of controlling a confluent flow control device for a working device of a construction machine according to the first embodiment of the present disclosure.
Figure 8:
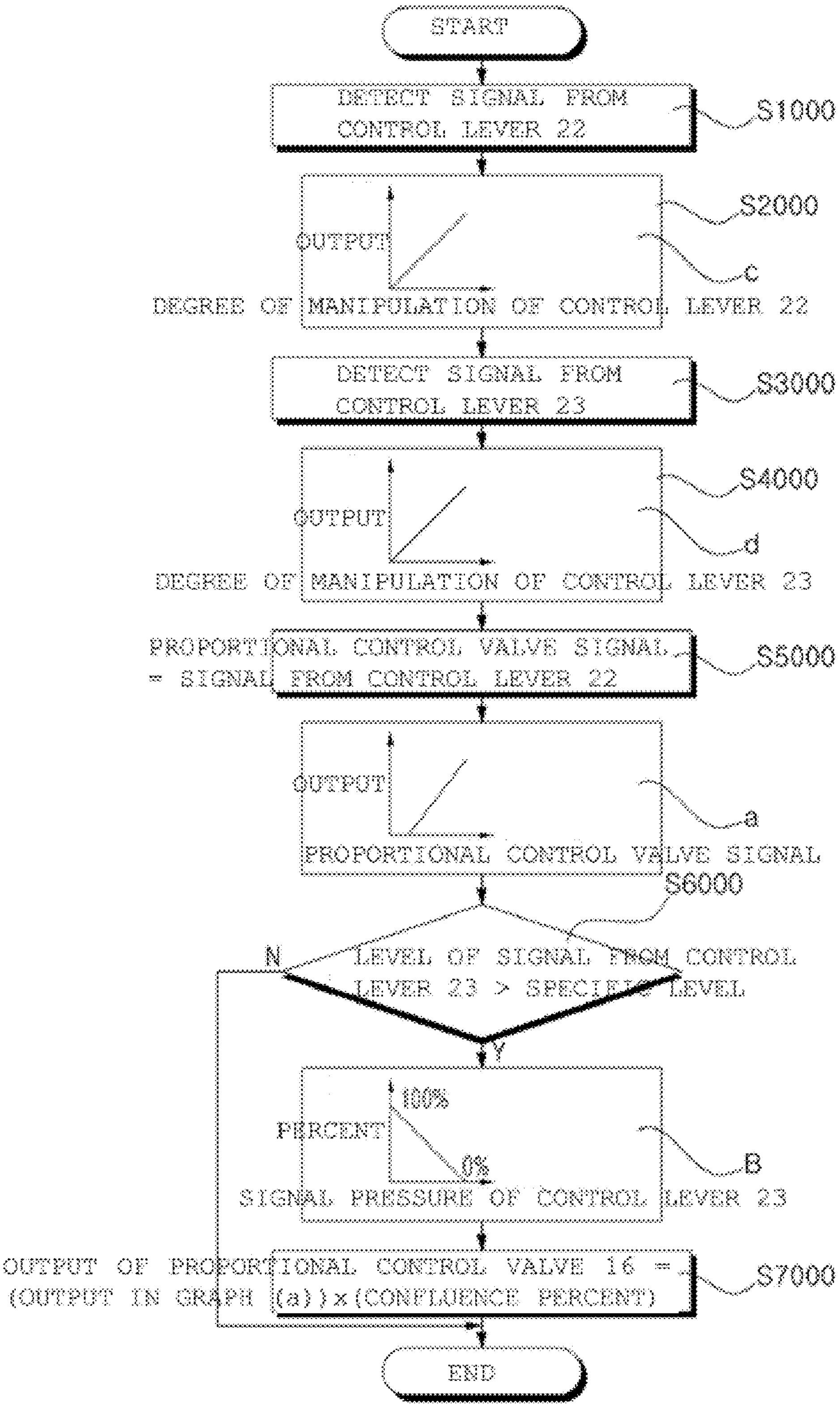
FIG. 8 is a flowchart illustrating the method of controlling a confluent flow control device for a working device of a construction machine according to the second embodiment of the present disclosure.

FIG. 3 is a hydraulic circuit diagram illustrating a first embodiment of a confluent flow control device for a working device of a construction machine according to the present disclosure, FIG. 4 is a hydraulic circuit diagram illustrating a second embodiment of a confluent flow control device for a working device of a construction machine according to the present disclosure, FIG. 6 is a flowchart illustrating a method of controlling a confluent flow control device for a working device of a construction machine according to the first embodiment of the present disclosure, FIG. 7 is a flowchart illustrating a confluence shutting-off method of the confluence valve in the method of controlling a confluent flow control device for a working device of a construction machine according to the first embodiment of the present disclosure, and FIG. 8 is a flowchart illustrating a method of controlling a confluent flow control device for a working device of a construction machine according to the present disclosure.

Referring to FIG. 3, the first embodiment of the confluent flow control device for a working device of a construction machine according to the present disclosure includes:

a first variable displacement hydraulic pump 2, a second variable displacement hydraulic pump 3, and a pilot pump 20;

a first hydraulic control lever 4 and a second hydraulic control lever 5 outputting control signals corresponding to the degree of manipulation;

a first working device (not shown) being actuated by hydraulic fluid supplied by the first hydraulic pump 2;

a second working device (not shown) being actuated by hydraulic fluid supplied by the second hydraulic pump;

a first working device control valve 7 disposed on a supply passage 6 between the first hydraulic pump 2 and the first working device to control the direction and flow rate of hydraulic fluid supplied to the first working device when switched by pilot pressure applied thereto in response to the first hydraulic control lever 4 being manipulated;

a second working device control valve 9 disposed on a supply passage 8 between the second hydraulic pump 3 and the second working device to control the direction and flow rate of hydraulic fluid supplied to the second working device when switched by pilot pressure applied thereto in response to the second hydraulic control lever 5 being manipulated;

a confluence valve 10 disposed on the supply passage 8, upstream of the second working device control valve 9, wherein the confluence valve 10, when switched by pilot pressure supplied by the pilot pump 20, allows a portion of hydraulic fluid discharged from the second hydraulic pump 3 to flow through a confluence passage 14 to join hydraulic fluid discharged from the first hydraulic pump 2, whereby the first and second working devices perform complex operations;

a first proportional control valve 16 disposed on a pilot line 11 between the pilot pump 20 and the confluence valve 10 to convert pilot pressure supplied to the confluence valve 10 by the pilot pump 20 to a secondary pressure corresponding to an electrical signal applied thereto and applying the secondary pressure to the confluence valve 10;

a controller 17 calculating the electrical signal from pilot pressures applied to the first working device control valve 7 and the second working device control valve 9 to be proportional to the degree of manipulation of the first hydraulic control lever 4 and the second hydraulic control lever 5 and applying the electrical signal to the first proportional control valve 16;

a first pressure sensor 21 detecting a level of pilot pressure applied to the first working device control valve 7 to be proportional to the degree of manipulation of the first hydraulic control lever 4 and inputting the detected level of pilot pressure to the controller 17; and a second pressure sensor 15 detecting a level of pilot pressure applied to the second working device control valve 9 to be proportional to the degree of manipulation of the second hydraulic control lever 5 and inputting the detected level of pilot pressure to the controller 17.

Referring to FIG. 6, the first exemplary embodiment of the method of controlling a confluent flow control device for a working device of a construction machine is illustrated.

In the controlling method, the confluent flow control device includes: first and second variable displacement hydraulic pumps 2 and 3; a pilot pump 20; first and second hydraulic control levers 4 and 5 outputting control signals corresponding to the degree of manipulation; first and second working devices (not shown) being actuated by hydraulic fluid supplied by the first and second hydraulic pumps 2 and 3; first and second working device control valves 7 and 9 controlling the operations of the first and second working devices when switched by pilot pressure applied thereto in response to the first and second hydraulic control levers 4 and 5 being manipulated; a confluence valve 10, wherein the confluence valve 10, when switched by pilot pressure applied by the pilot pump 20, allows a portion of hydraulic fluid discharged from the second hydraulic pump 3 to flow through a confluence passage 14 to join hydraulic fluid discharged from the first hydraulic pump 2, whereby the first and second working devices perform complex operations; a first proportional control valve 16 converting pilot pressure supplied to the confluence valve 10 by the pilot pump 20 to a secondary pressure corresponding to an electrical signal applied thereto; and a controller 17 applying the electrical signal to the first proportional control valve 16, the electrical signal corresponding to pilot pressures formed in response to the first and second hydraulic control levers 4 and 5 being manipulated. The controlling method includes:

Step S10 of detecting a level of pilot pressure formed in response to the first hydraulic control lever 4 being manipulated and step S20 of detecting a level of pilot pressure formed in response to the second hydraulic control lever 5 being manipulated;

Step S30 of forming pilot pressure supplied to the first proportional control valve 16 by the pilot pump 20 to a secondary pilot pressure based on an electrical signal applied to the first proportional control valve 16 to be proportional to the degree of manipulation of the first hydraulic control lever and applying the formed secondary pilot pressure to the confluence valve 10;

Step S40 of comparing the level of pilot pressure detected in response to the second hydraulic control lever 5 being manipulated with a predetermined specific level; and Step S50 of applying, when the level of pilot pressure detected in response to the second hydraulic control lever 5 being manipulated is greater than the specific level, an electrical signal to the first proportional control valve 16 to apply a level of pilot pressure to the confluence valve 10, the level of pilot pressure being obtained by multiplying a level of secondary pilot pressure output from the first proportional control valve 16 to be proportional to the degree of manipulation of the first hydraulic control lever 4 by a level of secondary pilot pressure output from the first proportional control valve 16 to be inversely proportional to the degree of manipulation of the second hydraulic control lever 5.

In the case in which the second working device control valve 9 is switched by manipulating the second hydraulic control lever 5 after a portion of hydraulic fluid discharged from the second hydraulic pump 3 is allowed to join hydraulic fluid discharged from the first hydraulic pump 2 through switching of the confluence valve 10 in response to the first hydraulic control lever 4 being manipulated, when a difference between the levels of pilot pressure applied to the first and second working device control valves 7 and 9 in response to the first and second hydraulic control levers 4 and 5 being manipulated is greater than a specific level, it is possible to stop joining of hydraulic fluid by shutting off the supply of pilot pressure to the confluence valve 10 by applying an electrical signal to the first proportional control valve 16.

According to the above described configuration, when the first hydraulic control lever 4 is manipulated to operate the first working device, the spool of the first working device control valve 7 is switched to the right, as depicted in the drawing, by pilot pressure applied thereto. In response to the switching of the first working device control valve 7, hydraulic fluid discharged from the first hydraulic pump 2 is transferred to the passage 14*a* through the supply passage 6 and the first working device control valve 7.

Here, when the degree of manipulation of the first hydraulic control lever 4 is increased, pilot pressure applied to the first working device control valve 7 is measured by the first pressure sensor 21 (S10, S100), and the measured pilot pressure is input to the controller 17.

Thus, the pressure of hydraulic fluid supplied to the first proportional control valve 16 by the pilot pump 20 is converted to a secondary pilot pressure corresponding to an electrical signal applied by the controller 17 to the first proportional control valve 16. The converted secondary pilot pressure is applied to the confluence valve 10 to switch the spool thereof to the left, as depicted in the drawing.

Here, since the pressure of hydraulic fluid supplied to the first proportional control valve 16 by the pilot pump 20 is used as a first pressure, pilot pressure equal to, amplified from, or reduced from pilot pressure formed in response to the first hydraulic control lever 4 being manipulated may be used as a secondary pilot pressure applied to the confluence valve 10 by the first proportional control valve 16.

Subsequently, the spool of the confluence valve 10 is switched to the left, as depicted in the drawing to correspond to pilot pressure applied by the first proportional control valve 16. Thus, hydraulic fluid discharged from the second hydraulic pump 3 is supplied to a first working device hydraulic cylinder (not shown) through the supply passage 8, the confluence valve 10, the supply passage 14, and the passage 14*a*.

Here, when the second hydraulic control lever 5 is manipulated to operate the second working device, a level of pilot pressure applied to the second working device control valve 9 is measured by the second pressure sensor 15, and then the measured level of pilot pressure is input to the controller 17 (S200).

The controller 17 compares the level of pilot pressure measured by the second pressure sensor 15 with a predetermined specific level (S40, S300).

When the level of pilot pressure input in response to the second hydraulic control lever 5 being manipulated is greater than the specific level, an electrical signal is applied to the first proportional control valve 16 to apply a level of pilot pressure to the confluence valve 10, the level of pilot pressure being obtained by multiplying a level of secondary pilot pressure output from the first proportional control valve 16 to be proportional to the degree of manipulation of the first hydraulic control lever 4 by a level of secondary pilot pressure output from the first proportional control valve 16 to be inversely proportional to the degree of manipulation of the second hydraulic control lever 5 (S50, S400).

Thus, when the degree of manipulation of the second hydraulic control lever 5 is increased to the maximum stroke, a joining percentage becomes zero “0” as represented by a graph “b” in FIG. 6, whereby a secondary pilot pressure is not applied to the confluence valve 10 by the first proportional control valve 16. This causes the spool of the confluence valve 10 to return to the neutral position, thereby canceling a joining function. Consequently, hydraulic fluid discharged from the second hydraulic pump 3 can be supplied to a second working device hydraulic cylinder (not shown) through the supply passage 8, the confluence valve 10 in the neutral position, and the second working device control valve 9.

Referring to FIG. 4, the second embodiment of the confluent flow control device for a working device of a construction machine according to the present disclosure includes:

a first variable displacement hydraulic pump 2, a second variable displacement hydraulic pump 3, and a pilot pump 20;

a first electrical control lever 22 and a second electrical control lever 23 outputting control signals corresponding to the degree of manipulation;

a first working device (not shown) being actuated by hydraulic fluid supplied by the first hydraulic pump 2;

a second working device (not shown) being actuated by hydraulic fluid supplied by the second hydraulic pump;

a first working device control valve 7 disposed on a supply passage 6 between the first hydraulic pump 2 and the first working device to control the direction and flow rate of hydraulic fluid supplied to the first working device when switched by pilot pressure applied by the pilot pump 20, with the level of pilot pressure corresponding to the degree of manipulation of the first electrical control lever 22;

a second working device control valve 9 disposed on a supply passage 8 between the second hydraulic pump 3 and the second working device to control the direction and flow rate of hydraulic fluid supplied to the second working device when switched by pilot pressure applied by the pilot pump 20, with the level of pilot pressure corresponding to the degree of manipulation of the second electrical control lever 23;

a confluence valve 10 disposed on the supply passage 8, upstream of the second working device control valve 9, wherein the confluence valve 10, when switched by pilot pressure supplied by the pilot pump 20, allows a portion of hydraulic fluid discharged from the second hydraulic pump 3 to flow through a confluence passage 14 to join hydraulic fluid discharged from the first hydraulic pump 2, whereby the first and second working devices perform complex operations;

a first proportional control valve 16 disposed on a pilot line 11 between the pilot pump 20 and the confluence valve 10 to convert the pressure of hydraulic fluid supplied by the pilot pump 20 to a secondary pilot pressure corresponding to an electrical signal applied thereto and apply the converted secondary pilot pressure to the confluence valve 10;

a second proportional control valve 19 disposed on a pilot line 24 between the pilot pump 20 and the first working device control valve 7 to convert the pressure of hydraulic fluid supplied by the pilot pump 20, the pressure of hydraulic fluid corresponding to the degree of manipulation of the first electrical control lever 22, to a secondary pilot pressure corresponding to an electrical signal applied thereto and apply the converted secondary pilot pressure to the first working device control valve 7;

a third proportional control valve 18 disposed on a pilot line 25 between the pilot pump 20 and the second working device control valve 9 to convert the pressure of hydraulic fluid supplied by the pilot pump 20, the pressure of hydraulic fluid corresponding to the degree of manipulation of the second electrical control lever 23, to a secondary pilot pressure corresponding to an electrical signal applied thereto and apply the converted secondary pilot pressure to the first working device control valve 7; and a controller 17 calculating the electrical signal to be proportional to the degree of manipulation of the first electrical control lever 22 and the second electrical control lever 23 and applying the calculated electrical signals to the first proportional control valve 16.

Referring to FIG. 8, the second exemplary embodiment of the method of controlling a confluent flow control device for a working device of a construction machine is illustrated.

In the controlling method, the confluent flow control device includes: first and second variable displacement hydraulic pumps 2 and 3; a pilot pump 20; first and second electrical control levers 22 and 23 outputting control signals corresponding to the degree of manipulation; first and second working devices (not shown) being actuated by hydraulic fluid supplied by the first and second hydraulic pumps 2 and 3; first and second working device control valves 7 and 9 controlling the operations of the first and second working devices when switched by electrical signals in response to the first and second electrical control levers 22 and 23 being manipulated; a confluence valve 10, wherein the confluence valve 10, when switched by pilot pressure supplied by the pilot pump 20, allowing a portion of hydraulic fluid discharged from the second hydraulic pump 3 to flow through a confluence passage 14 to join hydraulic fluid discharged from the first hydraulic pump 2, whereby the first and second working devices perform complex operations; a first proportional control valve 16 converting the pressure of hydraulic fluid supplied to the confluence valve 10 by the pilot pump 20 to a secondary pilot pressure corresponding to an applied electrical signal; a second proportional control valve 19 converting the pressure of hydraulic fluid supplied to the first working device control valve 7 by the pilot pump 20 to a secondary pilot pressure corresponding to an applied electrical signal; a third proportional control valve 18 converting the pressure of hydraulic fluid supplied to the second working device control valve 9 by the pilot pump 20 to a secondary pilot pressure corresponding to an applied electrical signal; and a controller 17 calculating the electrical signal to be proportional to the degree of manipulation of the first and second electrical control levers 22 and 23 and applying the calculated electrical signal to the first proportional control valve 16. The controlling method includes:

Step S1000 of detecting an electrical signal generated in response to the first electrical control lever 22 being manipulated;

Step S2000 of calculating an electrical signal to be proportional to the degree of manipulation of the first electrical control lever 22 and applying the calculated electrical signal to the second proportional control valve 19.

Step S3000 of detecting an electrical signal generated in response to the second electrical control lever 23 being manipulated;

Step S4000 of calculating an electrical signal to be proportional to the degree of manipulation of the second electrical control lever 23 and applying the calculated electrical signal to the third proportional control valve 18;

Step S5000 of converting the pressure of hydraulic fluid supplied to the first proportional control valve 16 by the pilot pump 20 to a secondary pilot pressure based on an electrical signal applied to the first proportional control valve 16 to be proportional to the degree of manipulation of the first electrical control lever 22 and applying the converted secondary pilot pressure to the confluence valve 10;

Step S6000 of comparing a level of an electrical signal detected in response to the second electrical control lever 23 being manipulated with a predetermined specific level; and Step S7000 of, when the level of the electrical signal detected in response to the second electrical control lever 23 being manipulated is greater than the specific level, applying an electrical signal to the first proportional control valve 16 to apply a level of pilot pressure to the confluence valve 10, the level of pilot pressure being obtained by multiplying a level of secondary pilot pressure output from the first proportional control valve 16 to be proportional to the degree of manipulation of the first electrical control lever 22 by a level of secondary pilot pressure output from the first proportional control valve 16 to be inversely proportional to the degree of manipulation of the second electrical control lever 23.

In the case of switching the second working device control valve 9 by manipulating the second electrical control lever 23 after a portion of hydraulic fluid discharged from the second hydraulic pump 3 is allowed to join hydraulic fluid discharged from the first hydraulic pump 2 through switching of the confluence valve 10 in response to the first electrical control lever 22 being manipulated, when a difference between the levels of electrical signals applied to the second and third proportional control valves 19 and 18 in response to the first and second electrical control levers 23 being manipulated is greater than a specific level, it is possible to stop the joining of hydraulic fluid by shutting off the supply of pilot pressure to the confluence valve 10 by applying an electrical signal to the first proportional control valve 16.

Here, except for the first and the electrical control levers 22 and 23, the second proportional control valve 19 disposed on the pilot line 24 between the pilot pump 20 and the first working device control valve 7, and the third proportional control valve 18 disposed on the pilot line 25 between the pilot pump 20 and the second working device control valve 9, the other components are the same as those of the confluent flow control device for a working device illustrated in FIG. 3. Descriptions of the same components will be omitted, and the same reference numerals or signs will be used to designate the same or like components.

According to the configuration as described above, when the first electrical control lever 22 is manipulated to operate the first working device, an electrical signal corresponding to the degree of manipulation of the first electrical control lever is input to the controller 17. The second proportional control valve 19 converts the pressure of hydraulic fluid supplied by the pilot pump 20 to a secondary pilot pressure, based on an electrical signal applied by the controller 17 corresponding to the degree of manipulation of the first electrical control lever 22, and applies the converted secondary pilot pressure to the first working device control valve 7.

That is, as the spool of the first working device control valve 7 is switched to the right, as depicted in the drawing, hydraulic fluid discharged from the first hydraulic pump 2 is transferred to the passage 14*a* through the supply passage 6 and the first working device control valve 7.

When the degree of manipulation of the first electrical control lever 22 is increased, the controller 17 applies an electrical signal corresponding to the degree of manipulation of the first electrical control lever 22 to the first proportional control valve 16. Subsequently, the first proportional control valve 16 converts the pressure of hydraulic fluid supplied by the pilot pump 20 to a secondary pilot pressure corresponding to the electrical signal, and the converted secondary pilot pressure is applied to the confluence valve 10 to switch the spool to the left, as depicted in the drawing.

Consequently, hydraulic fluid discharged from the second hydraulic pump 3 is transferred to the passage 14*a* through the supply passage 8, confluence valve 10, and the confluence passage to join hydraulic fluid supplied to the passage 14*a* by the first hydraulic pump 2, and then a confluent flow of hydraulic fluid is supplied to a hydraulic cylinder for the first working device.

In addition, when the second electrical control lever 23 is manipulated to operate the second working device, an electrical signal corresponding to the degree of manipulation of the second electrical control lever 23 is input to the controller 17. The third proportional control valve 18 converts the pressure of hydraulic fluid supplied by the pilot pump 20 to secondary pilot pressure, based on an electrical signal applied by the controller 17 corresponding to the degree of manipulation of the second electrical control lever 23, and applies the converted secondary pilot pressure to the second working device control valve 9.

When the level of the electrical signal input to the controller in response to the second electrical control lever 23 being manipulated is greater than a predetermined specific level, an electrical signal is applied to the first proportional control valve 16 to apply a level of pilot pressure to the confluence valve 10, the level of pilot pressure being obtained by multiplying a level of secondary pilot pressure output from the first proportional control valve 16 to be proportional to the degree of manipulation of the first electrical control lever 22 by a level of secondary pilot pressure output from the first proportional control valve 16 to be inversely proportional to the degree of manipulation of the second electrical control lever 23.

Thus, when the degree of manipulation of the second electrical control lever 23 is increased to the maximum stroke, secondary pilot pressure is not applied to the confluence valve 10 by the first proportional control valve 16. This causes the spool of the confluence valve 10 to return to the neutral position, thereby canceling a hydraulic fluid joining function. Consequently, hydraulic fluid discharged from the second hydraulic pump 3 can be supplied to a hydraulic cylinder (not shown) of the second working device through the supply passage 8, the confluence valve 10 in the neutral position, and the second working device control valve 9.

Although the exemplary embodiments of the present disclosure have been described for illustrative purposes, a person having ordinary skill in the art will appreciate that various modifications and alterations are possible, without departing from the scope and spirit of the present invention as disclosed in the accompanying claims.

INDUSTRIAL APPLICABILITY

According to the present disclosure as set forth above, when flows of fluid supplied to working devices to enable the working devices to perform complex operations join, the operability of accurately and reliably manipulating the confluence valve is obtained, thereby providing convenience to an operator. In addition, since pilot pressure supplied to the proportional control valve to control pilot pressure supplied to the confluence valve is supplied by the pilot pump, the spools for the working devices can be switched without interruption, and it is possible that the proportional control valve outputs secondary pilot pressure different from a control signal output from the control lever.

The invention claimed is:

1. A confluent flow control device for a working device of a construction machine, the device comprising:

a first variable displacement hydraulic pump, a second variable displacement hydraulic pump, and a pilot pump;

a first hydraulic control lever and a second hydraulic control lever outputting control signals corresponding to degrees of manipulation;

a first working device being actuated by hydraulic fluid supplied by the first hydraulic pump;

a second working device being actuated by hydraulic fluid supplied by the second hydraulic pump;

a first working device control valve disposed on a supply passage between the first hydraulic pump and the first working device to control a direction and flow rate of hydraulic fluid supplied to the first working device when switched by pilot pressure applied thereto in response to the first hydraulic control lever being manipulated;

a second working device control valve disposed on a supply passage between the second hydraulic pump and the second working device to control a direction and flow rate of hydraulic fluid supplied to the second working device when switched by pilot pressure applied thereto in response to the second hydraulic control lever being manipulated;

a confluence valve disposed on the supply passage between the second hydraulic pump and the second working device, upstream of the second working device control valve, wherein the confluence valve, when switched by pilot pressure supplied by the pilot pump, allows a portion of hydraulic fluid discharged from the second hydraulic pump to flow through a confluence passage to join hydraulic fluid discharged from the first hydraulic pump, whereby the first and second working devices perform complex operations;

a first proportional control valve disposed on a pilot line between the pilot pump and the confluence valve to convert pilot pressure supplied to the confluence valve by the pilot pump to a secondary pressure corresponding to an electrical signal applied to first proportional control valve and applying the converted secondary pressure to the confluence valve; and a controller calculating the electrical signal from pilot pressure applied to the first working device control valve and the second working device control valve to be proportional to degrees of manipulation of the first hydraulic control lever and the second hydraulic control lever and applying the calculated electrical signals to the first proportional control valve.

2. The confluent flow control device of claim 1, further comprising:

a first pressure sensor detecting a level of pilot pressure applied to the first working device control valve to be proportional to the degree of manipulation of the first hydraulic control lever and inputting the detected level of pilot pressure to the controller; and a second pressure sensor detecting a level of pilot pressure applied to the second working device control valve to be proportional to the degree of manipulation of the second hydraulic control lever and inputting the detected level of pilot pressure to the controller.

3. A confluent flow control device for a working device of a construction machine, the device comprising:

a first variable displacement hydraulic pump, a second variable displacement hydraulic pump, and a pilot pump;

a first electrical control lever and a second electrical control lever outputting control signals corresponding to degrees of manipulation;

a first working device being actuated by hydraulic fluid supplied by the first hydraulic pump;

a second working device being actuated by hydraulic fluid supplied by the second hydraulic pump;

a first working device control valve disposed on a supply passage between the first hydraulic pump and the first working device to control a direction and flow rate of hydraulic fluid supplied to the first working device when switched by pilot pressure applied by the pilot pump, with the pilot pressure corresponding to a degree of manipulation of the first electrical control lever;

a second working device control valve disposed on a supply passage between the second hydraulic pump and the second working device to control a direction and flow rate of hydraulic fluid supplied to the second working device when switched by pilot pressure applied by the pilot pump, with the pilot pressure corresponding to a degree of manipulation of the second electrical control lever;

a confluence valve disposed on the supply passage between the second hydraulic pump and the second working device, upstream of the second working device control valve, wherein the confluence valve, when switched by pilot pressure supplied by the pilot pump, allows a portion of hydraulic fluid discharged from the second hydraulic pump to flow through a confluence passage to join hydraulic fluid discharged from the first hydraulic pump, whereby the first and second working devices perform complex operations;

a first proportional control valve disposed on a pilot line between the pilot pump and the confluence valve to convert pressure of hydraulic fluid supplied by the pilot pump to secondary pilot pressure corresponding to an electrical signal applied to the first proportional control valve and apply the converted secondary pilot pressure to the confluence valve;

a second proportional control valve disposed on a pilot line between the pilot pump and the first working device control valve to convert pressure of hydraulic fluid supplied by the pilot pump to secondary pilot pressure corresponding to an electrical signal applied to the second proportional control valve corresponding to the degree of manipulation of the first electrical control lever, and apply the converted secondary pilot pressure to the first working device control valve;

a third proportional control valve disposed on a pilot line between the pilot pump and the second working device control valve to convert pressure of hydraulic fluid supplied by the pilot pump to secondary pilot pressure corresponding to an electrical signal applied to the third proportional control valve corresponding to the degree of manipulation of the second electrical control lever, and apply the converted secondary pilot pressure to the second working device control valve; and a controller calculating the electrical signal from the electrical signals applied to the second proportional control valve and the third proportional control valve to be proportional to the degrees of manipulation of the first electrical control lever and the second electrical control lever and applying the calculated electrical signal to the first proportional control valve.

4. A method of controlling a confluent flow control device for a working device of a construction machine, the device comprising: first and second variable displacement hydraulic pumps; a pilot pump; first and second hydraulic control levers outputting control signals corresponding to degrees of manipulation; first and second working devices being actuated by hydraulic fluid supplied by the first and second hydraulic pumps; first and second working device control valves controlling operations of the first and second working devices when switched by pilot pressure applied thereto in response to the first and second hydraulic control levers being manipulated; a confluence valve, wherein the confluence valve, when switched by pilot pressure applied by the pilot pump, allows a portion of hydraulic fluid discharged from the second hydraulic pump to flow through a confluence passage to join hydraulic fluid discharged from the first hydraulic pump, whereby the first and second working devices perform complex operations; a first proportional control valve converting pilot pressure supplied to the confluence valve by the pilot pump to a secondary pressure corresponding to an electrical signal applied to the first proportional control valve; and a controller applying the electrical signal to the first proportional control valve, the electrical signal corresponding to pilot pressure formed in response to the first and second hydraulic control levers being manipulated, the method comprising:

detecting a level of pilot pressure formed in response to the first hydraulic control lever being manipulated and detecting a level of pilot pressure formed in response to the second hydraulic control lever being manipulated;

converting pilot pressure supplied to the first proportional control valve by the pilot pump to a secondary pilot pressure based on an electrical signal applied to the first proportional control valve to be proportional to a degree of manipulation of the first hydraulic control lever and applying the secondary pilot pressure to the confluence valve;

comparing the level of pilot pressure detected in response to the second hydraulic control lever being manipulated with a predetermined specific level; and when the level of pilot pressure detected in response to the second hydraulic control lever being manipulated is greater than the specific level, applying an electrical signal to the first proportional control valve to apply a level of pilot pressure to the confluence valve, the level of pilot pressure being obtained by multiplying a level of secondary pilot pressure output from the first proportional control valve to be proportional to the degree of manipulation of the first hydraulic control lever by a level of secondary pilot pressure output from the first proportional control valve to be inversely proportional to a degree of manipulation of the second hydraulic control lever.

5. A method of controlling a confluent flow control device for a working device of a construction machine, the device comprising: first and second variable displacement hydraulic pumps; a pilot pump; first and second electrical control levers outputting control signals corresponding to degrees of manipulation; first and second working devices being actuated by hydraulic fluid supplied by the first and second hydraulic pumps; first and second working device control valves controlling operations of the first and second working devices when switched by electrical signals applied in response to the first and second electrical control levers being manipulated; a confluence valve, wherein the confluence valve, when switched by pilot pressure supplied by the pilot pump, allows a portion of hydraulic fluid discharged from the second hydraulic pump to flow through a confluence passage to join hydraulic fluid discharged from the first hydraulic pump, whereby the first and second working devices perform complex operations; a first proportional control valve converting pressure of hydraulic fluid supplied to the confluence valve by the pilot pump to a secondary pilot pressure corresponding to an applied electrical signal; a second proportional control valve converting pressure of hydraulic fluid supplied to the first working device control valve by the pilot pump to a secondary pilot pressure corresponding to an applied electrical signal; a third proportional control valve converting the pressure of hydraulic fluid supplied to the second working device control valve by the pilot pump to a secondary pilot pressure corresponding to an applied electrical signal; and a controller calculating the electrical signal from the electrical signals applied to the second and third proportional control valves to be proportional to degrees of manipulation of the first and second electrical control levers and applying the calculated electrical signal to the first proportional control valve, the method comprising:

detecting an electrical signal generated in response to the first electrical control lever being manipulated;

calculating an electrical signal to be proportional to the degree of manipulation of the first electrical control lever and applying the calculated electrical signal to the second proportional control valve;

detecting an electrical signal generated in response to the second electrical control lever being manipulated;

calculating an electrical signal to be proportional to the degree of manipulation of the second electrical control lever and applying the calculated electrical signal to the third proportional control valve;

converting pilot pressure supplied to the first proportional control valve by the pilot pump to a secondary pilot pressure based on an electrical signal applied to the first proportional control valve to be proportional to the degree of manipulation of the first electrical control lever and applying the converted secondary pilot pressure to the confluence valve;

comparing a level of an electrical signal detected in response to the second electrical control lever being manipulated with a predetermined specific level; and when the level of the electrical signal detected in response to the second electrical control lever being manipulated is greater than the specific level, applying an electrical signal to the first proportional control valve to apply a level of pilot pressure to the confluence valve, the level of pilot pressure being obtained by multiplying a level of secondary pilot pressure output from the first proportional control valve to be proportional to the degree of manipulation of the first electrical control lever by a level of secondary pilot pressure output from the first proportional control valve to be inversely proportional to the degree of manipulation of the second electrical control lever.

6. The method of claim 4, wherein, in a case of switching the second working device control valve by manipulating the second hydraulic control lever after a portion of hydraulic fluid discharged from the second hydraulic pump is allowed to join hydraulic fluid discharged from the first hydraulic pump through switching of the confluence valve in response to the first hydraulic control lever being manipulated, when a difference between levels of pilot pressure applied to the first and second working device control valves in response to the first and second hydraulic control levers being manipulated is greater than a specific level, joining of hydraulic fluid is stopped by shutting off supply of pilot pressure to the confluence valve by applying an electrical signal to the first proportional control valve.

7. The method of claim 5, wherein, in a case of switching the second working device control valve by manipulating the second electrical control lever after a portion of hydraulic fluid discharged from the second hydraulic pump is allowed to join hydraulic fluid discharged from the first hydraulic pump through switching of the confluence valve in response to the first electrical control lever being manipulated, when a difference between levels of electrical signals applied to the second and third proportional control valves in response to the first and second electrical control levers being manipulated is greater than a specific level, the joining of hydraulic fluid is stopped by shutting off supply of pilot pressure to the confluence valve by applying an electrical signal to the first proportional control valve.

* * * * *